US012449297B2

(12) United States Patent
Buhl

(10) Patent No.: US 12,449,297 B2
(45) Date of Patent: Oct. 21, 2025

(54) RETAIL WEIGHING SCALE

(71) Applicant: Bizerba SE & Co. KG, Balingen (DE)

(72) Inventor: Steffen Buhl, Winterlingen (DE)

(73) Assignee: BIZERBA SE & CO. KG, Balingen (DE)

( * ) Notice: Subject to any disclaimer, the term of this patent is extended or adjusted under 35 U.S.C. 154(b) by 376 days.

(21) Appl. No.: 18/083,599

(22) Filed: Dec. 19, 2022

(65) Prior Publication Data

US 2023/0213374 A1 Jul. 6, 2023

(30) Foreign Application Priority Data

Dec. 31, 2021 (EP) ..................... 21218423

(51) Int. Cl.
G01G 21/28 (2006.01)
(52) U.S. Cl.
CPC .................. G01G 21/283 (2013.01)
(58) Field of Classification Search
CPC .............. G01G 21/28; G01G 21/283
See application file for complete search history.

(56) References Cited

U.S. PATENT DOCUMENTS

| | | | | |
|---|---|---|---|---|
| 7,163,311 B2* | 1/2007 | Kramer | .............. | G09B 19/0092 220/574.3 |
| 9,091,587 B2* | 7/2015 | Kawamura | ............ | G01G 21/28 |
| 11,853,992 B2* | 12/2023 | Kawaguchi | .......... | G07G 1/0054 |
| 2007/0186515 A1* | 8/2007 | Ruetten | ................ | G07G 1/0072 211/85.15 |
| 2016/0356640 A1* | 12/2016 | Freeman | .............. | G08B 21/182 |
| 2017/0123199 A1* | 5/2017 | Jones | ...................... | F21V 23/06 |
| 2018/0112861 A1* | 4/2018 | Hagelaar | .................. | H05K 3/12 |
| 2019/0204195 A1* | 7/2019 | Staub | ....................... | G01B 5/28 |
| 2019/0249854 A1* | 8/2019 | Shen | ..................... | F21V 15/015 |
| 2021/0186241 A1* | 6/2021 | Kramer | ............. | G01G 19/4146 |
| 2021/0262851 A1* | 8/2021 | Blankley, Jr. | ...... | G06Q 30/0641 |

FOREIGN PATENT DOCUMENTS

| | | |
|---|---|---|
| DE | 102009049567 A1 | 4/2011 |
| DE | 202011050040 U1 | 7/2011 |
| DE | 102011083562 A1 | 3/2013 |

* cited by examiner

Primary Examiner — Natalie Huls
(74) Attorney, Agent, or Firm — LEYDIG, VOIT & MAYER, LTD.

(57) ABSTRACT

A weighing scale includes a weighing module which has a housing in which a load cell is accommodated. The load cell has a fixed portion, a deformation portion, and a movable portion. The fixed portion is connected to the housing, and the movable portion bears a spider having a platter. The deformation portion has a strain gauge configured to measure a weight acting on the platter. The housing is formed as a single piece and in a trough shape. A strip light is attached to an external wall of the housing and is attached substantially all around the housing. The weighing scale further has a controller with a state machine which is configured to depict at least one technical state of the weighing scale, the control unit being configured to actuate the strip light on the basis of the state of the state machine.

14 Claims, 3 Drawing Sheets

RETAIL WEIGHING SCALE

CROSS REFERENCE TO RELATED APPLICATIONS

This application claims benefit to European Patent Application No. EP 21218423.8, filed on Dec. 31, 2021, which is hereby incorporated by reference herein.

FIELD

The present disclosure relates to a weighing scale, in particular to a retail weighing scale, comprising a weighing module.

BACKGROUND

Weighing scales generally comprise an operator display for interacting with the weighing scale, for example for displaying a weight or for displaying malfunctions. In the process, operators have to navigate through various menu levels to obtain specific information about the state of the weighing scale. This is often complex and unintuitive for operators.

SUMMARY

In an embodiment, the present disclosure provides a weighing scale that includes a weighing module which has a housing in which a load cell is accommodated. The load cell has a fixed portion, a deformation portion, and a movable portion. The fixed portion is connected to the housing, and the movable portion bears a spider having a platter. The deformation portion has a strain gauge configured to measure a weight acting on the platter. The housing is formed as a single piece and in a trough shape. A strip light is attached to an external wall of the housing and is attached substantially all around the housing. The weighing scale further has a controller with a state machine which is configured to depict at least one technical state of the weighing scale, the control unit being configured to actuate the strip light on the basis of the state of the state machine.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
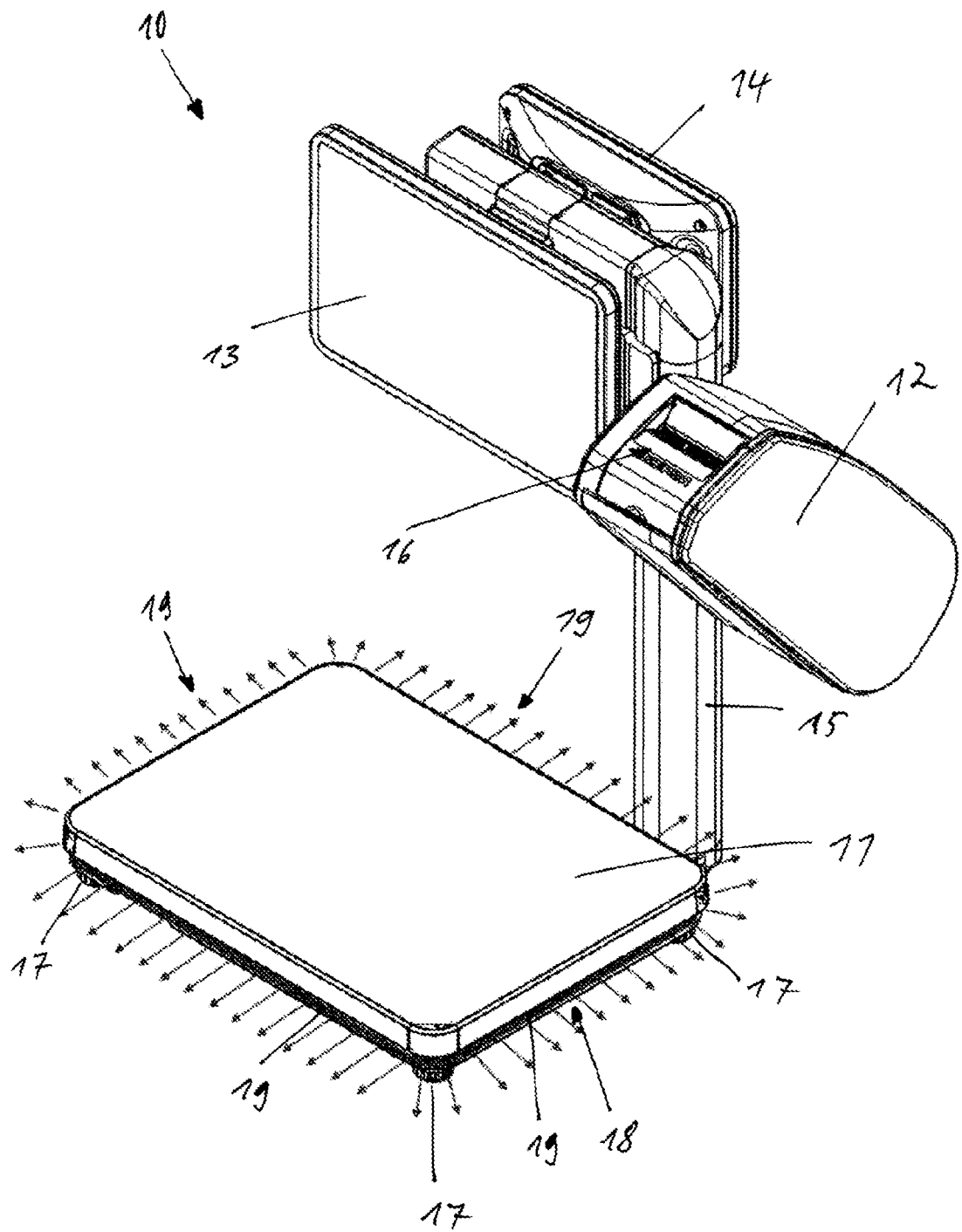
FIG. 1 shows a weighing scale according to an aspect of the present disclosure.

The present disclosure relates to a weighing scale, in particular to a retail weighing scale, comprising a weighing module. The weighing module may include a housing in which a load cell is accommodated. The load cell may include a fixed portion, a deformation portion, and a movable portion. The fixed portion may be connected to the housing, and the movable portion may bear a spider comprising a platter. The deformation portion can have a strain gauge for measuring a weight acting on the platter.

Aspects of the present disclosure provide a device that informs operators of the state of the weighing scale and makes it simpler for them to interact with the weighing scale.

According to the present disclosure, a weighing scale, in particular a retail weighing scale, is provided. The weighing scale comprises a weighing module. The weighing module comprises a housing in which a load cell is accommodated. The load cell comprises a fixed portion, a deformation portion, and a movable portion. The fixed portion is connected to the housing. The movable portion bears a spider comprising a platter. The deformation portion has a strain gauge for measuring a weight acting on the platter. The housing is formed as a single piece and in a trough shape. A strip light is attached to the external wall of the single-piece housing substantially all around the housing. In this context, "substantially all around" means that the strip light extends around three sides and a significant part of the fourth side of the housing but the start and end of the strip light need not be connected or meet. Thus, it also means that there is a gap between the start and end of the strip light on the side on which the start and end extend toward each other. The weighing scale comprises a control unit comprising a state machine, which depicts at least one technical state of the weighing scale, the control unit actuating the strip light on the basis of the state of the state machine. In one embodiment, the technical state depicted by the state machine is a paper supply in a printer. In one embodiment, the technical state depicted by the state machine is a difference from a desired weight, which difference is established from the weight ascertained by the load cell and the desired weight. In one embodiment, the technical state depicted by the state machine is outdated software that has to be updated with updates. In one embodiment, the technical state depicted by the state machine is a rate of various weight detection steps or of processing steps input via an operator display. In one embodiment, the technical state depicted by the state machine is that an operator has correctly verified their identity on the weighing scale via the operator display.

A person skilled in the art construes a housing formed as a single piece and in a trough shape to mean a shape of a housing that resembles a trough. It has a square or rectangular footprint, it being possible for the corners to be rounded. The housing has a main body which, in one embodiment, is made of a cast metal and may thus also have complex shapes, in particular openings and internal walls. The length and width of the housing are substantially greater than the height thereof. The housing comprises a base plate having side walls that are formed in one piece on the base plate. The housing is open at the top and has a clearance in the interior for receiving various modules, such as the load cell, electronic modules, and the like, in the interior of the housing. In one embodiment, the internal region of the housing is covered on top by a cover. The expression "as a single piece and in a trough shape" also includes a housing that has partitions for various spaces or stability struts in the interior. In addition, it also includes a housing of which the base plate is stepped at some points such as to produce a clearance at said points of the housing underneath the base plate of the housing when the main body is set down on a flat surface. This clearance is used, for example, for attaching connectors underneath the housing. The housing should be construed as being a single piece and in a trough shape even when through-openings are present at various points in the in particular stepped base plate or side walls, for example for attaching plug sockets, leading through cables, or fitting supports and other elements of the weighing scale. The term "in a trough shape" should therefore be taken to be merely descriptive of the basic appearance of the housing.

In one embodiment, the strip light extends around the housing once; in particular, the strip light extends around the housing once in the upper region of its side walls, it being possible for there to be a gap between the start and end of the strip light, which gap is small by comparison with the length of the strip light. In the process, the weighing scale comprises a platter positioned on the spider. In this case, the external edges of the platter lead over the spider and over the top rim of the housing so that the platter floats on the top side of the housing in the manner of a lid. In one embodiment, the strip light is located in the upper region of the side walls of the housing but underneath the edges of the platter. In one embodiment, the strip light is attached to the upper edge of the housing such as to be covered by the projecting edges of the platter. In this case, the light from the strip light diffusely shines out below the downwardly projecting edges of the platter.

In one embodiment, the strip light consists of a flexible substrate. The LED lamps are arranged on the flexible substrate. In one embodiment, the substrate comprises one to ten LED lamps per cm of length.

In one embodiment, electrical lines for actuating the LED lamps are integrated in the flexible substrate material of the strip light.

In one embodiment, the LED lamps generate light in the wavelength range from 230 nm to 500 nm. The substrate, together with the LED lamps, is coated with phosphorus. In particular, the strip light is coated with phosphorus on the side on which the LED lamps are attached. Phosphorus converts the blue or ultraviolet light from the LED lamps into white light.

It should be noted in particular that each LED lamp is not or has not been coated with phosphorus individually and separately, but rather the LED lamps are first fitted on the substrate and then the whole side of the substrate is coated with phosphorus. The density of the LED lamps per unit of length of the strip light can thus be considerably increased, leading to a very homogeneous light effect. As a result, the illumination by the light from the LED lamps is additionally around 170° in relation to the plane of the strip light; in other words, the light can be perceived even from very acute angles.

In one embodiment, the flexible substrate comprises first, second, and third LED lamps. The first LED lamps generate light in a wavelength range from 450 nm to 500 nm. The second LED lamps generate light in a wavelength range from 500 nm to 570 nm. The third LED lamps generate light in a wavelength range from 610 nm to 760 nm. The first, second, and third LED lamps are arranged in regular arrangements on the substrate. The first LED lamps form a first group of LED lamps. The second LED lamps form a second group of LED lamps. The third LED lamps form a third group of LED lamps. The LED lamps of each particular group are actuated jointly by the control unit. In one embodiment, the strip light is coated with silicone on the side on which the LED lamps are attached. Silicone is light-transmitting. At the same time, a diffuse effect is produced such that the light from the individual LED lamps is somewhat scattered. Superposed colors thus result from the three groups of LED lamps, which can be perceived by the human eye as blue, green, and red, and so almost the entire RGB color space is available.

In one embodiment, the flexible substrate has a layer of adhesive material on the opposite side from the LED lamps. In one embodiment, the layer is a layer of heat-conducting adhesive material. The strip light is attached, in particular glued, to the housing by the adhesive material. The heat produced by the LED lamps is dissipated to the housing by way of the layer of adhesive material, in particular by way of the heat-conducting adhesive material.

In the process, the adhesive material adheres on a surface of uncoated and/or coated cast metal, so the housing may be coated or uncoated at the point at which the strip light is glued.

In one embodiment, the strip light is electrically connected to the control unit. The strip light is actuated by the control unit using a DC voltage in the range from 6 V to 36 V, in particular 12 V or 24 V.

In one embodiment, the housing comprises a recess or a single-sided recess, which is made all around the outside of the housing in the upper housing region and into which the strip light is glued. A "recess" in this case should be construed as an indentation in the housing wall, in the form of a groove. A "single-sided recess" refers to an angle that is present, for example, in an obliquely extending housing wall. The angle forms an indentation, the back end of which for receiving the strip light is a vertical plane.

In one embodiment, the weighing scale comprises a diffuser, which is attached to the exterior of the housing and covers the recess. The diffuser ensures the light from the LED light sources is scattered such that they are no longer discernible as discrete light sources but rather it appears as though they are one elongate, homogeneous light source. In addition, the diffuser ensures that the strip light has the same brightness from every viewing angle. The diffuser boosts the effect of the phosphorus or silicone.

In one embodiment, the diffuser consists of a translucent material. In one embodiment, the translucent material is a translucent polycarbonate.

In one embodiment, the diffuser comprises a structuring on its outside. The structuring makes the diffuser opaque when looking from the outside toward the housing. By contrast, the diffuser is translucent when looking from the housing side outward.

In one embodiment, the diffuser is formed as a ring. The ring has the dimensions of the housing in the region of the recess. The ring is form-fittingly attached to the housing by way of the recess. In particular, the ring is attached by a latching mechanism. In one embodiment, the diffuser covers the recess. In one embodiment, the diffuser is glued or screwed to the housing.

In one embodiment, the distance between the LED lamps and the inner side of the diffuser is less than 3 mm. In one embodiment, the distance between the LED lamps and the inner side of the diffuser is less than 1 mm.

FIG. 1 shows a weighing scale 10 according to the present disclosure in accordance with a first embodiment. The weighing scale comprises a weighing module having a housing 18 in which a load cell is accommodated. The load cell bears a spider, which in turn bears a platter 11. The platter 11 has a downwardly projecting edge that protrudes over the upper rim of the housing 18. A stand 15 is fastened to the weighing module and bears a printer 12 having a label dispenser 16. The stand 15 further bears an operator display 13, which is formed as a touchscreen, and a customer display 14 on the opposite side from the operator display 13. The weighing module rests on four feet 17 attached in its corners.

A strip light 19 is attached all around the outer edge of the housing 18 and is actuated by a control unit depending on a technical state of the weighing scale.

Figure 2:
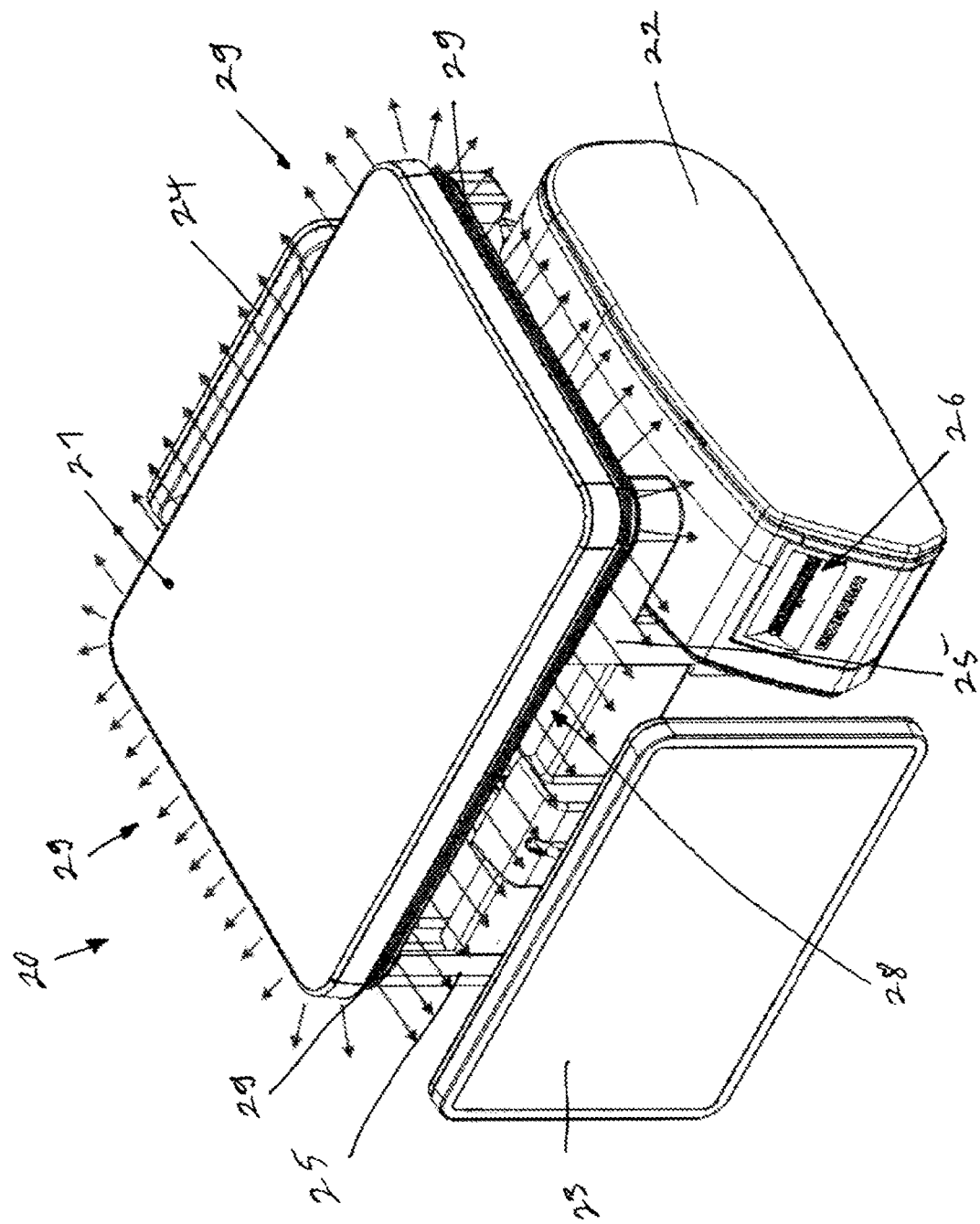
FIG. 2 shows a weighing scale according to an aspect of the present disclosure.

FIG. 2 shows a weighing scale 20 according to the present disclosure in accordance with a second embodiment. The weighing scale comprises a weighing module having a housing 28 in which a load cell is accommodated. The load cell bears a spider, which in turn bears a platter 21. The platter 21 has a downwardly projecting edge that protrudes over the upper rim of the housing 28. The weighing module rests on a frame 25, which bears a printer 22 having a label dispenser 26. The frame 25 further bears an operator display 23, which is formed as a touchscreen, and a customer display 24 on the opposite side from the operator display 23. A strip light 29 is attached all around the outer edge of the housing 28 and is actuated by a control unit depending on a technical state of the weighing scale.

Figure 3:
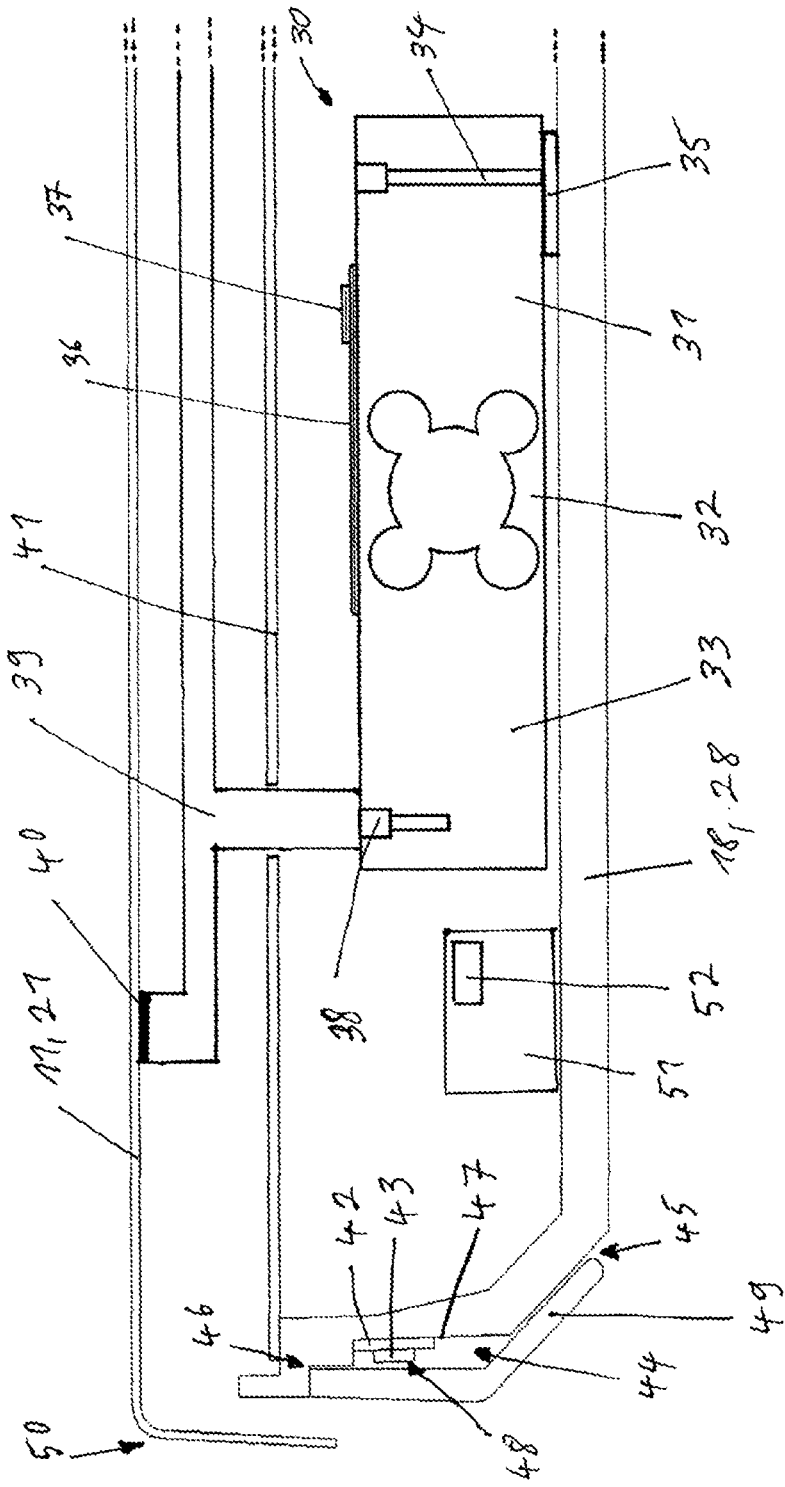
FIG. 3 shows a detail of a retail weighing scale according to an aspect of the present disclosure.

FIG. 3 is a section through the housing 18, 28 of a weighing scale 10, 20. The housing 18, 28 is a cast-metal housing and may be made in complex shapes. Inside the housing 18, 28, a load cell 30 is screwed on a plinth 35 by screws 34. The load cell 30 comprises a fixed portion 31 screwed to the housing 18, 28, a deformation portion 32, and a movable portion 33, to which a spider 39 is attached by a fastener 38. The spider 39 bears the platter 11, 21 of the weighing scale, rubber cushions 40 being attached between the spider 39 and platter 11, 21. At its edges, the platter 11, 21 comprises a bend 50 such that the platter 11, 21 protrudes downward at the sides over the upper edges of the housing 18, 28. The weight force of a product on the platter 11, 21 and also the weight force of the spider 39 and platter 11, 21 themselves thus act on the movable portion 33 of the load cell 30. This leads to a mechanical deformation of the deformation portion 32, and this is measured by means of the strain gauge 36 attached to the deformation portion 32. The measured deformation is determined by an evaluation unit 37 and converted into a weight value of the product. The interior of the housing 18, 28, in which the load cell 30 and also a control unit (controller) 51 and, where applicable, other components of the weighing scale, for example a power supply unit and the like, are located, is covered by a cover 41.

The housing 18, 28 consists of a base plate and four upwardly protruding side walls. The housing is made of cast metal and thus formed in one piece. The transition between the base plate and side walls is beveled. A recess 44 is made in the upper region of the side walls such that a vertical external wall 47 is slightly recessed at the side walls of the housing 18, 28. The substrate 42 of the strip light 19, 29 is glued fast to said vertical external wall 47. The substrate 42 is made of flexible material and can thus also be guided around the corners of the housing 18, 28 in the recess 44. In this context, 'flexible' means that the substrate 42 can be bent at least perpendicularly to the plane in which the substrate 42 extends but not necessarily also in the plane of the substrate 42 itself. LED lamps 43 are attached to the substrate 42. The LED lamps 43 may be attached in the longitudinal direction of the substrate 42 at a density of up to ten LED lamps 43 per cm. The substrate 42 and LED lamps 43 are covered, on the LED lamp side, with a protective layer 48 of silicone or phosphorus. In this case, the protective layer 48 is not merely attached to the LED lamps 43 themselves before they are fitted on the substrate 42, but rather it is attached over the substrate 42 and LED lamps 42 once the LED lamps 43 have been fitted on the substrate 42. In this way, a higher density of the LED lamps 43 on the substrate 42 can be achieved, and the beam angle for homogeneous light from each LED lamp 43 is increased to around 170°. A silicone protective layer 48 is applied when the LED lamps 43 generate light in the wavelength range from 450 nm to 500 nm, from 500 nm to 570 nm, and from 610 nm to 760 nm, respectively, and the various LED lamps 43 are arranged in regular arrangements on the substrate 42. As a result, the strip light 19, 29 can be made to illuminate in RGB colors by way of the control unit 51. A phosphorus protective layer 48 is applied when the LED lamps 43 emit light in the wavelength range from 230 nm to 500 nm (ultraviolet to blue light). Owing to the phosphorus protective layer 48, the operator perceives this light as white light.

The recess 44, together with the substrate 42, LED lamps 43, and protective layer 48, is covered by a diffuser 49. The diffuser 49 offers mechanical protection for the strip light 19, 29 while simultaneously refracting the light such that the strip light 19, 29 acts like a homogeneous light source. For this purpose, the diffuser 49 can be structured, i.e., surface-treated, on its external surface. The effect whereby the strip light 19, 29 acts as a homogeneous light source is brought about by the high density of LED lamps 43 and by the joint silicone or phosphorus protective layer 48 on the LED lamps 43 and is reinforced or rounded out by the diffuser 49 and the external structuring of the diffuser 49. The diffuser 49 abuts surfaces 45, 46 of the housing 18, 28 above and below the recess 44 and is glued to said surfaces 45, 46, latched thereto by a latching connection, or screwed thereto. The diffuser 49 is an annular component that is pushed over the housing 18, 28 from below and form-fittingly fits onto the side walls of the housing 18, 28. The diffuser 49 is made of translucent material, in particular of translucent polycarbonate.

The control unit 51 comprises a state machine 52, which depicts at least one technical state of the weighing scale. The control unit actuates the strip light 19, 29 on the basis of the state of the state machine 52.

The technical state depicted by the state machine may be a paper supply in a printer, a difference from a desired weight, which difference is established from the weight ascertained by the load cell and the desired weight, outdated software that has to be updated with updates, a speed of various weight detection steps or of processing steps input via an operator display, or the fact that an operator has correctly verified their identity on the weighing scale via the operator display. Depending on the state which the state machine is in on the basis of various input parameters from the load cell, sensors, or weighing scale control system, the strip light may, for example, be actuated in different colors (red, yellow, green) in the case of an RGB strip light, or in a lit-up or flashing manner in the case of a monochromatic strip light.

The functions of various elements shown in the drawings, including the functional blocks, may be implemented by dedicated hardware or by generic hardware capable of executing software, in conjunction with the corresponding software. If the functions are provided by means of a processor, they may be provided by a single dedicated processor, a single shared processor, or a plurality of generic processors which may in turn be shared. The functions may be provided, without limitation, by a digital signal processor (DSP), network processor, application-specific integrated circuit (ASIC), field programmable gate array (FPGA), read-only memory (ROM) with stored software, random access memory (RAM), and non-volatile memories.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A weighing scale, the weighing scale comprising:
a weighing module, the weighing module comprising:
a housing in which a load cell is accommodated, the load cell comprising a fixed portion, a deformation portion, and a movable portion, the fixed portion being connected to the housing, and the movable portion bearing a spider comprising a platter, the deformation portion having a strain gauge configured to measure a weight acting on the platter,
wherein the housing is formed as a single piece and in a trough shape,
wherein a strip light is attached to an external wall of the housing and is attached substantially all around the housing, and
wherein the weighing scale further comprises a controller comprising a state machine which is configured to depict at least one technical state of the weighing scale, the controller being configured to actuate the strip light on the basis of the state of the state machine,
wherein the housing comprises a recess or a single-sided recess, which is made all around an outside of the housing in an upper housing region and into which the strip light is glued,
wherein the weighing scale further comprises a diffuser, which is attached to the exterior of the housing and covers the recess,
wherein the diffuser consists of a translucent material, and
wherein the diffuser comprises, on its outside, a structuring that makes it opaque when looking from the outside toward the housing, and the diffuser is translucent when looking from the housing side outward.

2. The weighing scale according to claim 1, wherein the strip light comprises a flexible substrate on which LED lamps are arranged.

3. The weighing scale according to claim 2, wherein electrical lines for actuating the LED lamps are integrated in the flexible substrate of the strip light.

4. The weighing scale according to claim 2,
wherein the LED lamps are configured to generate light in a wavelength range from 230 nm to 500 nm and are coated with phosphorus, and
wherein the strip light is coated with phosphorus on a side on which the LED lamps are attached.

5. The weighing scale according to claim 2, wherein the flexible substrate comprises first, second, and third LED lamps, which are configured to generate light in a wavelength range from 450 nm to 500 nm, from 500 nm to 570 nm, and from 610 nm to 760 nm, respectively, and the first, second, and third LED lamps are arranged in regular arrangements on the substrate, the first, second, and third LED lamps being configured to be actuated jointly in respective groups, and the strip light being coated with silicone on the side on which the LED lamps are attached.

6. The weighing scale according to claim 2, wherein the flexible substrate has a layer of heat-conducting adhesive material on an opposite side from the LED lamps, the strip light being attached to the housing by the adhesive material.

7. The weighing scale according to claim 6, wherein the housing is made of a cast metal and the adhesive material adheres on a surface of uncoated and/or coated cast metal.

8. The weighing scale according to claim 2, wherein the substrate comprises one to ten LED lamps per cm of length.

9. The weighing scale according to claim 1, wherein the strip light is electrically connected to the controller, and the strip light is configured to be actuated by the controller using a DC voltage in the range from 6 V to 36 V.

10. The weighing scale according to claim 1, wherein the diffuser is formed as a ring which has the dimensions of the housing in the region of the recess and which is form-fittingly attached to the housing by way of the recess.

11. The weighing scale according to claim 1, wherein the diffuser covers the recess and is glued or screwed to the housing.

12. The weighing scale according to claim 1, wherein a distance between the LED lamps and an inner side of the diffuser is less than 3 mm.

13. A weighing scale, the weighing scale comprising:
a weighing module, the weighing module comprising:
a housing in which a load cell is accommodated, the load cell comprising a fixed portion, a deformation portion, and a movable portion, the fixed portion being connected to the housing, and the movable portion bearing a spider comprising a platter, the deformation portion having a strain gauge configured to measure a weight acting on the platter,
wherein the housing is formed as a single piece and in a trough shape,
wherein a strip light is attached to an external wall of the housing and is attached substantially all around the housing, and
wherein the weighing scale further comprises a controller comprising a state machine which is configured to depict at least one technical state of the weighing scale, the controller being configured to actuate the strip light on the basis of the state of the state machine,
wherein the housing comprises a recess or a single-sided recess, which is made all around an outside of the housing in an upper housing region and into which the strip light is glued,
wherein the weighing scale further comprises a diffuser, which is attached to the exterior of the housing and covers the recess, and
wherein the diffuser is formed as a ring which has the dimensions of the housing in the region of the recess and which is form-fittingly attached to the housing by way of the recess.

14. A weighing scale, the weighing scale comprising:
a weighing module, the weighing module comprising:
- a housing in which a load cell is accommodated, the load cell comprising a fixed portion, a deformation portion, and a movable portion, the fixed portion being connected to the housing, and the movable portion bearing a spider comprising a platter, the deformation portion having a strain gauge configured to measure a weight acting on the platter, wherein the housing is formed as a single piece and in a trough shape, wherein a strip light is attached to an external wall of the housing and is attached substantially all around the housing, and wherein the weighing scale further comprises a controller comprising a state machine which is configured to depict at least one technical state of the weighing scale, the controller being configured to actuate the strip light on the basis of the state of the state machine, wherein the housing comprises a recess or a single-sided recess, which is made all around an outside of the housing in an upper housing region and into which the strip light is glued, wherein the weighing scale further comprises a diffuser, which is attached to the exterior of the housing and covers the recess, and wherein the diffuser covers the recess and is glued or screwed to the housing.

\* \* \* \* \*